US010298412B2

United States Patent
Harms et al.

(10) Patent No.: US 10,298,412 B2
(45) Date of Patent: *May 21, 2019

(54) USER-CONFIGURABLE INTERACTIVE REGION MONITORING

(71) Applicant: Samsung Electronics Company, Ltd., Suwon si, Gyeonggi-do (KR)

(72) Inventors: Brian Harms, San Jose, CA (US); Pol Pla, Palo Alto, CA (US); Yedan Qian, Sunnyvale, CA (US); Olivier Bau, San Francisco, CA (US)

(73) Assignee: Samsung Electronics Company, Ltd., Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/040,438

(22) Filed: Jul. 19, 2018

(65) Prior Publication Data

US 2018/0323992 A1 Nov. 8, 2018

Related U.S. Application Data

(63) Continuation of application No. 15/015,040, filed on Feb. 3, 2016, now Pat. No. 10,057,078.

(Continued)

(51) Int. Cl.
*H04W 72/00* (2009.01)
*H04L 12/28* (2006.01)
(Continued)

(52) U.S. Cl.
CPC ............ *H04L 12/282* (2013.01); *G06F 3/011* (2013.01); *G06F 3/017* (2013.01); *H04W 4/021* (2013.01);
(Continued)

(58) Field of Classification Search
CPC ......... H04L 12/282; H04L 2012/2841; H04W 4/021
(Continued)

(56) References Cited

U.S. PATENT DOCUMENTS 8,386,514 B2 * 2/2013 Cheng ................. G06F 17/3087
707/774
8,929,612 B2 * 1/2015 Ambrus ............. G06K 9/00362
382/115
(Continued)

FOREIGN PATENT DOCUMENTS

WO WO 2012/121433 A1 9/2012
WO WO 2015/113833 A1 8/2015
(Continued)

OTHER PUBLICATIONS

Extended Search Report for EP Application No. 16839506.9-1213, dated Jul. 30, 2018.

*Primary Examiner* — Marceau Milord
(74) *Attorney, Agent, or Firm* — Baker Botts L.L.P.

(57) ABSTRACT

In one embodiment, one or more systems may receive input from a user identifying an interactive region of a physical environment. The one or more systems may determine a location of the interactive region relative to a depth sensor and monitor, at least in part by the depth sensor, the interactive region for a predetermined event. The one or more systems may detect, at least in part by the depth sensor, the predetermined event. In response to detecting the predetermined event, the one or more systems may initiate a predetermined action associated with the predetermined event.

20 Claims, 10 Drawing Sheets

Related U.S. Application Data

(60) Provisional application No. 62/208,265, filed on Aug. 21, 2015.

(51) Int. Cl.

| | | |
|---|---|---|
| *H04W 4/021* | (2018.01) | |
| *H04W 4/04* | (2009.01) | |
| *G06F 3/01* | (2006.01) | |
| *H04W 4/33* | (2018.01) | |
| *G06K 9/00* | (2006.01) | |

(52) U.S. Cl.
CPC ............ *H04W 4/043* (2013.01); *H04W 4/33* (2018.02); *G06K 9/00335* (2013.01); *H04L 2012/2841* (2013.01)

(58) Field of Classification Search
USPC ...................................... 455/456.3
See application file for complete search history.

(56) References Cited

U.S. PATENT DOCUMENTS

| | | | |
|---|---|---|---|
| 9,135,710 B2* | 9/2015 | Cohen | G06T 7/0075 |
| 9,264,478 B2* | 2/2016 | Hon | H04L 65/1069 |
| 2011/0195782 A1* | 8/2011 | Mao | G06F 3/0317 |
| | | | 463/37 |
| 2011/0199389 A1* | 8/2011 | Lu | G06F 3/017 |
| | | | 345/619 |
| 2015/0002388 A1 | 1/2015 | Weston | |
| 2015/0304665 A1* | 10/2015 | Hannuksela | H04N 19/70 |
| | | | 375/240.02 |

FOREIGN PATENT DOCUMENTS

| | | |
|---|---|---|
| WO | WO 2015/117852 A1 | 8/2015 |
| WO | WO 2016/009016 A1 | 1/2016 |

\* cited by examiner

USER-CONFIGURABLE INTERACTIVE REGION MONITORING

PRIORITY

This application claims the benefit as a continuation under 35 U.S.C. § 120 of U.S. patent application Ser. No. 15/015,040 titled "User-Configurable Interactive Region Monitoring" and filed on 3 Feb. 2016, which claims the benefit, under 35 U.S.C. § 119(e), of U.S. Provisional Patent Application No. 62/208,265 filed 21 Aug. 2015, both of which are incorporated herein by reference.

TECHNICAL FIELD

This disclosure generally relates to electronic event detection.

BACKGROUND

A depth sensor may generate a depth image that includes an array of pixels corresponding to regions of a physical environment with a depth value for each pixel indicating the depth of the corresponding region. Depth images may be generated by stereo triangulation, sheet of light triangulation, structured light, interferometry, coded aperture, or other means.

Connected devices may be part of a communication network such as a local area network, wide area network, cellular network, the Internet, or any other suitable network. A connected device may use a communication network to communicate with other devices, for example, to access remotely-stored data, access remote processing power, access remote displays, provide locally-stored data, provide local processing power, or provide access to local displays. For example, networks may provide communication paths and links to servers, which may host applications, content, and services that may be accessed or utilized by connected devices. The content may include text, video data, audio data, user settings or other types of data. Networks may use any suitable communication protocol or technology to facilitate communication between connected devices, such as, for example, BLUETOOTH, IEEE WI-FI (802.11a/b/g/n/ac), or TCP/IP.

DESCRIPTION OF EXAMPLE EMBODIMENTS

Particular embodiments allow a user to configure interactive regions in a physical environment. The interactive regions may be monitored by an interactive region monitoring system for one or more predetermined events, such as, for example, events that have been defined by a user, automatically defined by a computing device, or both. In particular embodiments, the interactive region monitoring system may include one or more depth sensors. When one or more predetermined events are detected, a predetermined action may be initiated by the interactive region monitoring system. In some embodiments, the interactive region monitoring system communicates electronically with another connected device to initiate the action. An interactive region monitoring system may include one or more depth sensors, connected devices, servers, client systems, or any other devices or systems. Although this disclosure describes and illustrates particular interactive region monitoring systems, this disclosure contemplates any suitable interactive region monitoring system for creating interactive regions. In particular embodiments, an interactive region monitoring system may be part of, or connected to, a depth-sensing computing device.

Figure 1:
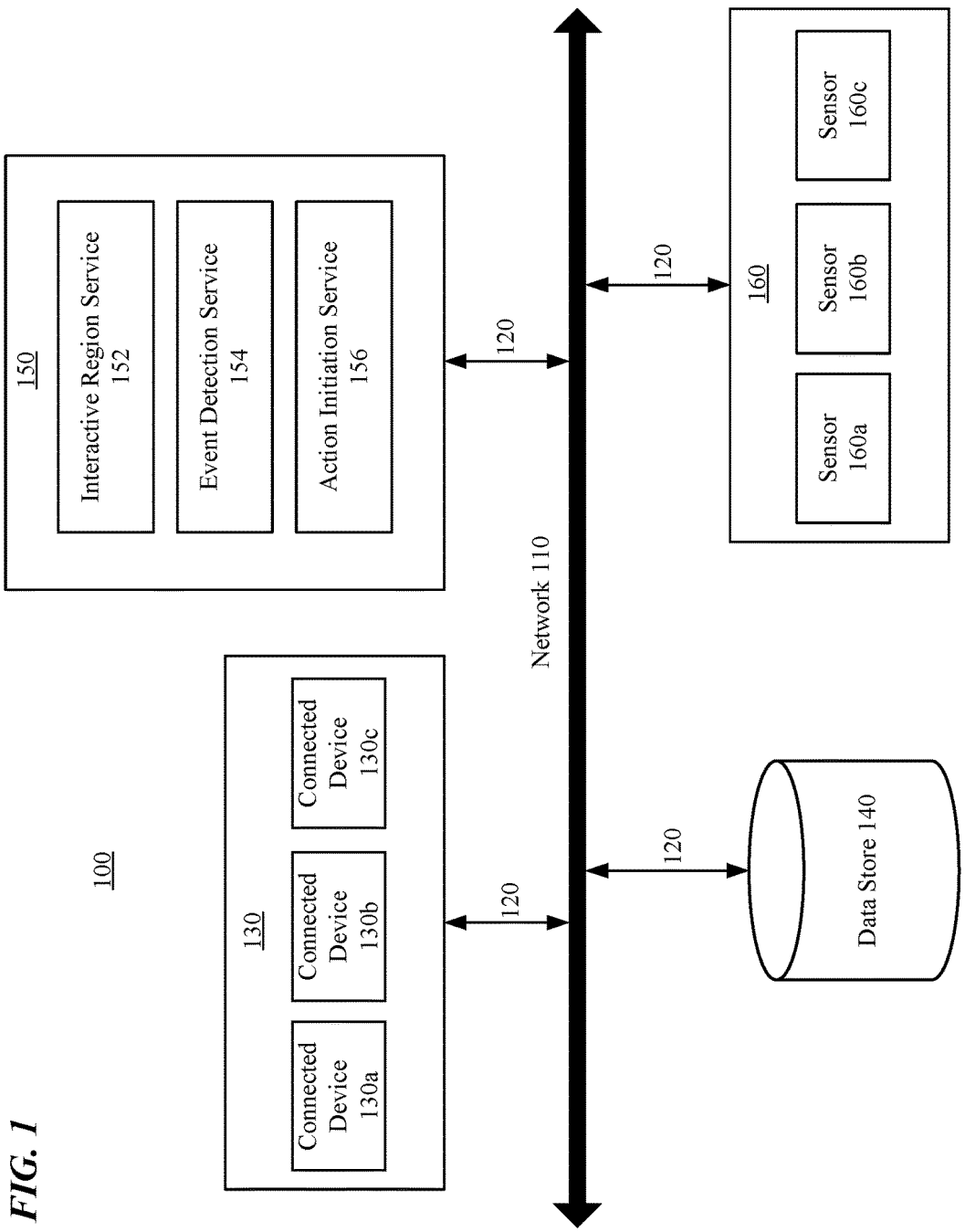
FIG. 1 illustrates an example network environment associated with an interactive region monitoring system.

FIG. 1 illustrates an example network environment 100 for particular embodiments of an interactive region monitoring system. Network environment 100 may include connected devices 130, data store 140, interactive region monitoring server 150, and sensors 160 connected to each other by network 110. Although FIG. 1 illustrates a particular arrangement of connected devices 130, data store 140, interactive region monitoring server 150, and sensors 160, this disclosure contemplates any suitable arrangement of connected devices 130, data store 140, interactive region monitoring server 150, and sensors 160. As an example and not by way of limitation, two or more of connected devices 130, data store 140, interactive region monitoring server 150, and sensors 160 may be connected to each other directly, bypassing network 110. As another example, two or more of connected devices 130, data store 140, interactive region monitoring server 150, and sensors 160 may be physically or logically co-located with each other in whole or in part. As an example, data store 140 may be directly connected to or co-located with interactive region monitoring server 150. As another example, one or more sensors 160 may be directly connected to or co-located with one or more connected devices 130. Moreover, although FIG. 1 illustrates a particular number of connected devices 130, data stores 140, interactive region monitoring servers 150, sensors 160, and networks 110 this disclosure contemplates any suitable number of connected devices 130, data stores 140, interactive region monitoring servers 150, sensors 160, and networks 110. As an example and not by way of limitation, network environment 100 may include multiple connected devices 130, data stores 140, interactive region monitoring servers 150, sensors 160, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 120 may connect connected devices 130, data store 140, interactive region monitoring server 150, and sensors 160 to communication network 110 or to each other. This disclosure contemplates any suitable links 120. In particular embodiments, one or more links 120 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 120 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 120, or a combination of two or more such links 120. Links 120 need not necessarily be the same throughout network environment 100. One or more first links 120 may differ in one or more respects from one or more second links 120. For example, a link 120 to connected device 130a may differ from a link 120 to connected device 130b and 130c. As another example, a link 120 to sensor 160a may differ in one or more respects from a link 120 to sensor 160b and 160c.

In particular embodiments, an interactive region monitoring system may include one or more connected devices 130, data stores 140, interactive region monitoring servers 150, or sensors 160. In particular embodiments, an interactive region monitoring system may be connected to one or more connected devices 130. Connected devices 130 may include, without limitation, a television set, a mobile device such as a smartphone or tablet, a personal computer, a laptop computer, a gaming console, a thermostat, a media device, or any other appropriate device. Connected devices 130 may, as an example, communicate with network 110 via a wireless communications protocol, such as Wi-Fi or BLUETOOTH. In some embodiments, interactive region monitoring server 150 may send an instruction to a connected device, such as an instruction to: turn on, turn off, tune to a particular channel, play audio, play video, or any other instruction.

In particular embodiments, an interactive region monitoring system may be connected to one or more sensors 160. Sensors 160 may include any appropriate sensor, include as an example and not by way of limitation, a depth sensor, an image sensor, a digital camera, a red-green-blue (RGB) camera, an infrared camera, a time-of-flight camera, a structured-light camera, a laser scanner, a radar, a LIDAR, a sonar, a proximity sensor, a motion detector, any other suitable sensor, or any suitable combination thereof. Sensors 160 may send data to interactive region monitoring server 150.

In some embodiments, data store 140 may include networked storage, as illustrated in FIG. 1, such as cloud storage or other network accessible storage. Additionally or alternatively, data store 140 may include local storage within or directly attached to interactive region monitoring server 150, such as solid state drives ("SSDs") or hard disk drives ("HDDs").

In particular embodiments, data store 140 may store a data structure corresponding to an interactive region. Such a data structure may include, as an example and not be way of limitation, a point cloud, a wire-frame model, a parametric-based model, a boundary representation, a binary space partitioning tree, a k-dimensional tree, an octree, a constructive solid geometry tree, a grid, a polygon mesh model, a surface model, a solid computer-aided design (CAD) model, or any other suitable data structure.

In particular embodiments, data store 140 may store template data corresponding to an event or event condition. Such a data structure may include, as an example and not by way of limitation, a template image or template skeletal tracking data. Additionally or alternatively, data store 140 may store algorithmic data corresponding to an event condition. As an example and not by way of limitation, data store 140 may store an algorithm that corresponds to an event condition that is a of a user's hand moving to the left at least 13 inches and then moving up at least 5 inches, but only if the time delay between the two movements is less than 1.3 seconds and only if the rest of the user's is relatively stable.

In particular embodiments, data store 140 may store data corresponding to an action. In some embodiments, such data may include data about one or more connected devices 130. As an example and not by way of limitation, such data may include a unique device identifier, information about the user of a connected device, device details (e.g., manufacturer, operating system, localized language, audio-visual capabilities, battery capacity, network connectivity specifications, etc.), details about software applications on a connected device (e.g., name, version, maximum message size, etc.), or other appropriate device data. In some embodiments, data store 140 may store data about an application programming interface (API) that corresponds to one or more connected devices 130 or one or more software applications configured to run on one or more connected devices 130. In some embodiments, data store 140 may store data that indicates an association between interactive regions, predetermined events, and predetermined actions.

In particular embodiments, data store 140 stores historical data. Historical data may include (1) one or more interactive regions that have been created and/or in which user interaction has occurred; (2) a time, date, or duration of user interactions; (3) data from an interactive region monitoring system; (4) information about predetermined events or event conditions; (5) information about predetermined actions; or (6) any other appropriate data, or any suitable combination thereof.

In some embodiments, interactive region monitoring server 150 communicates with one or more sensors 160. In some embodiments, interactive region monitoring server 150 communicates to one or more sensors 160 instructions to monitor an interactive region. For example, interactive region monitoring server 150 may communicate with data store 140 and retrieve a data structure corresponding to an interactive region. Based on the data structure, interactive region monitoring server 150 may direct one or more sensors 160 to monitor the corresponding interactive region for one or more or event conditions. In some embodiments, sensors 160 may not monitor portions of a physical environment that do not correspond to an interactive region.

In particular embodiments, an interactive region service 152 of interactive region monitoring server 150 may generate an appropriate form for communication with sensors 160 or data store 140. For example, interactive region service 152 may retrieve data from data store 140 that corresponds to an interactive region. Interactive region service 152 may also retrieve data from one or more sensors 160. Based on a comparison of the data corresponding to an interactive region and the data from one or more sensors 160, interactive region service 152 may instruct one or more sensors 160 to monitor an interactive region.

In particular embodiments, an event detection service 154 of interactive region monitoring server 150 may determine whether an event condition has occurred based on template data. For example, event detection service 154 may retrieve template data corresponding to an event condition from data store 140. Template data may include data from exemplars of an event condition (e.g., using data based on an exemplar provided by a user). Event detection service 154 may then compare the template data to the data retrieved from one or more sensors 160 to determine whether the event condition is detected. Additionally or alternatively, event detection service 154 may determine whether an event condition has occurred based on template data algorithmic data corresponding to an event condition, as described above. In some embodiments, event detection service 154 may detect a predetermined event by determining one or more event conditions associated with the predetermined event and based on the detection of the one or more event conditions.

In some embodiments, interactive region monitoring server 150 communicates with one or more connected devices 130. In some embodiments, interactive region monitoring server 150 communicates to one or more connected devices 130 to initiate a predetermined action. For example, interactive region monitoring server 150 may communicate with data store 140 and retrieve data corresponding to a predetermined action. Based on the data, interactive region monitoring server 150 may send an instruction to one or more connected devices 130 to initiate a predetermined action.

In particular embodiments, an action initiation service 156 of interactive region monitoring server 150 may initiate a predetermined action based on an association between interactive regions, events, and actions. For example, action initiation service 156 may retrieve data from data store 140 that indicates an association between interactive regions, events, and actions. Action initiation service 156 may also receive data from interactive region service 152 and event detection service 154 that indicates that an event in an associated interactive region has been detected. Based on this, action initiation service 156 may use the data indicating an association between interactive regions, predetermined events, and predetermined actions to cross-reference the interactive region and predetermined event with the associated predetermined action. Action initiation service 156 may then initiate the associated predetermined action.

In particular embodiments, an action initiation service 156 may determine an association between interactive regions, events, and actions based on a record for an interactive region. In some embodiments, the interactive region monitoring system maintains a data structure that includes a number of records (e.g., by storing the record in data store 140 and updating the record via instructions from interactive region monitoring server 150). Each record may define one or more interactive regions for monitoring and may be linked to one or more users. For example, each record can include data indicative of the coordinates of the interactive region, an event that triggers an action, the action that occurs in response to the event, and, in some embodiments, the device that performs the action. The interactive region monitoring system may generate a record based on user input (e.g., when a user configures an interactive region, defines an event, defines an action, etc.).

In particular embodiments, an action initiation service 156 may initiate an action by generating an appropriate instruction to send to one or more connected devices 130. For example, action initiation service 156 may retrieve data from data store 140 that corresponds to a predetermined action. The action may be performed by one or more of connected devices 130. Action initiation service may also retrieve from data store 140 about the one or more connected devices 130. Based on the data about the one or more connected devices 130, action initiation service may initiate an action by determining an appropriate instruction and sending that instruction to a connected device. For example, data about a mobile phone may include a phone number. In this example, if an action is to send a text message to the mobile phone, the action initiation service may use the phone number to uniquely identify the mobile phone for delivery of the text message (e.g., by emailing a short message service (SMS) gateway).

Figure 2:
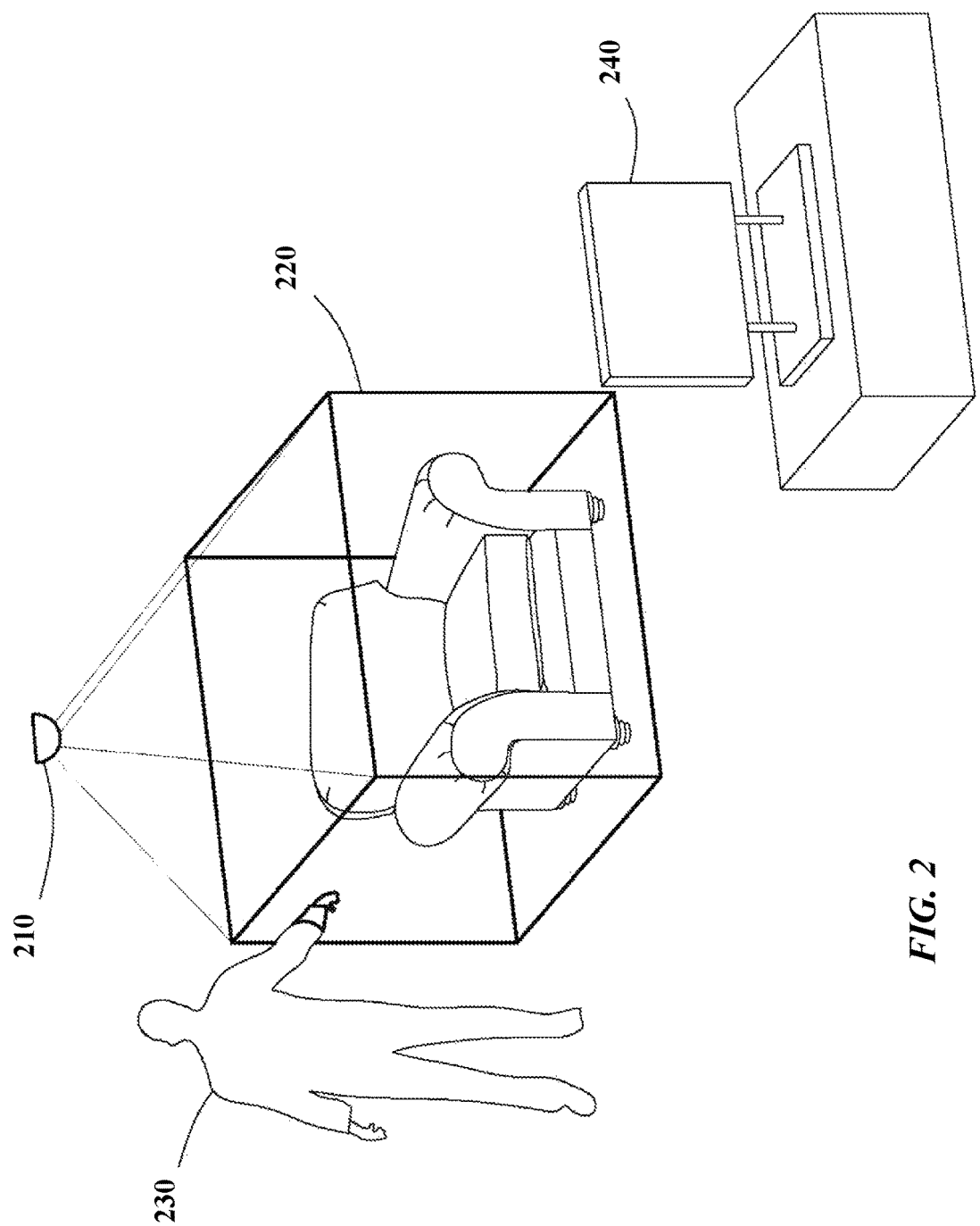
FIG. 2 illustrates an example interactive region in an example physical environment.

FIG. 2 illustrates an example embodiment of an interactive region in an example physical environment. In particular embodiments, depth sensor 210 generates a depth image as an output. A depth image may be an array of pixels corresponding to regions of a physical environment with a depth value for each pixel indicating the depth of the corresponding region. A depth image may be generated, as an example and not by way of limitation, by: stereo triangulation, sheet of light triangulation, structured light, interferometry, coded aperture, or any other appropriate means of detecting a depth image. In particular embodiments, depth sensor 210 may include or be a part of an electronic system which includes an image sensor, a digital camera, a red-green-blue (RGB) camera, an infrared camera, a time-of-flight camera, a structured-light camera, a laser scanner, a radar, a LIDAR, a sonar, a proximity sensor, a motion detector, any other suitable sensor, or any suitable combination thereof. In particular embodiments, depth sensor 210 (or an electronic system of which depth sensor 210 is a part) may also detect sound, chemical particles, electric current, electric potential, magnetic fields, air flow, light, pressure, force, temperature, heat, motion, images, time, date, biometric data, or any other data. In some embodiments, depth sensor 210 (or an electronic system of which depth sensor 210 is a part) may detect data about the movement of objects or people or the speed of objects or people.

In particular embodiments, an interactive region monitoring system may monitor (e.g., by depth sensor 210) one or more interactive regions, such as interactive region 220, for one or more predetermined events. An interactive region may take any suitable size, shape, or location within physical environment. As illustrated in FIG. 2, in particular embodiments an interactive region may be defined by a three-dimensional shape. In particular embodiments, an interactive region may be (or very nearly be) a surface, such as the surface of a table.

In particular embodiments, an interactive region monitoring system may monitor (e.g., by depth sensor 210) one or more interactive regions, such as interactive region 220, for one or more predetermined events. In some embodiments, a predetermined event may consist of two or more event conditions that collectively make up the event, i.e., a predetermined action may be initiated only when multiple events (which collectively are the predetermined event) are detected. As used herein, a predetermined event may occur within an interactive region when one or more event conditions making up the predetermined event occur within the interactive region. For example, a predetermined event may include two event conditions: 1) that a particular user enter an interactive region around or on a desk chair; and 2) that the temperature in the room be more than a threshold temperature. In this example, both event conditions may be required to trigger a predetermined action, such as turning on a fan or air conditioner. This disclosure contemplates that a predetermined event may be equivalent to an event condition or that a predetermined event may require the occurrence of multiple event conditions. This disclosure contemplates that, where suitable, disclosure relating to event conditions applies to predetermined events, and vice versa.

In particular embodiments, predetermined events and/or event conditions may include: movement within an interactive region, the presence or absence of an object or person within an interactive region, an object or person entering an interactive region, an object or person leaving an interactive region, or any other suitable event condition. In some embodiments, an event condition may be that other event conditions occur a particular order, within a particular time of one another, or any other relational condition. In particular embodiments, an event condition may include output from any sensor or device, such as the sensors or devices illustrated in FIG. 1. In particular embodiments, one or more event conditions may be determined by a user, e.g., from a list of event conditions. In some embodiments, an interactive region monitoring system may detect a predetermined event by receiving data from depth sensor 210, a connected device, or by a combination of devices that indicate that event conditions have occurred.

In some embodiments, a list of event conditions may include event conditions that do not require resource-intensive image processing, such as movement, a level of brightness, an object or user entering or leaving the interactive region, or any other suitable event. In particular embodiments, an event condition may include recognizing a particular object or object type, recognizing a user (such as the user's face or a client device of the user), recognizing a particular gesture or body position, or any other event condition.

In particular embodiments, a predetermined event or an event condition may not be detected unless a threshold event is detected. Detecting a threshold event may include receiving information (e.g., from a depth sensor, a connected device, a database, etc.) that a threshold event has been detected. As an example, an interactive region monitoring system may monitor interactive region 220 via depth sensor 210 to detect the presence of a person as a threshold event. Upon detecting user 230 in interactive region 220, the interactive region monitoring system may monitor interactive region 220 for particular user 230, for example, by processing the image captured by the depth sensor using facial recognition, which may be more resource-intensive to accomplish than is detection and processing of the triggering event. As this particular example illustrates, a relatively low resource-intensive threshold event may be detected and processed before one or more relatively resource-intensive tasks associated with detecting an event, thereby conserving computer resources during periods where the threshold event is not detected.

In particular embodiments, one or more connected devices communicatively coupled to the interactive region monitoring system may be used to detect a predetermined event or an event condition. For example, a particular user may have a connected device which communicates information that uniquely identifies its user. For example, user 230 may have a mobile phone, smart watch, tablet, laptop, or other device that communicates to an interactive region monitoring system (e.g., via BLUETOOTH) a unique identifier (e.g. a username, a phone number, a media access control (MAC) address, etc.) that identifies user 230. In an example embodiment, the interactive region monitoring system may determine whether a threshold condition has occurred. In response to a determination that a threshold condition has occurred, the interactive region monitoring system may broadcast a request for proximate connected devices to reply with information that uniquely identifies their users or the respective user devices.

In particular embodiments, an interactive region may be associated with one or more particular users. For example, an interactive region might be associated with user 230. In particular embodiments, the association may be determined from a data store, such as data store 140, that correlates the region and the user, for example through a profile for the user, a profile for the region, or both. In particular embodiments, the interactive region may not be monitored for a predetermined event unless a particular user's presence is detected in the interactive region. A user's presence may be detected by, for example, facial recognition. In another example, as discussed above, interactive region may broadcast a request for proximate connected devices to reply with information that uniquely identifies the user or users of the connected device. In this example, the interactive region may be monitored for a predetermined event only if a proximate connected device identifies the particular user associated with the interactive region. Additionally or alternatively, an interactive region may not be associated with any particular user.

In particular embodiments, an interactive region monitoring system may monitor an interactive region only when a threshold event is detected. For example, an interactive region may only be monitored during certain times of day, if an on/off toggle is on, or if any other event condition or predetermined event is satisfied.

In particular embodiments, a predetermined action may be initiated by an interactive region monitoring system when a predetermined event is detected, for example when one or more event conditions for the predetermined event are detected. Event conditions may include detecting a predetermined event within an interactive region and may include one or more other event conditions, such as the time of day; output from a device (such as a smartphone, watch, appliance, etc.); an environmental condition such as light, noise, temperature, etc.; or any other suitable event condition. A predetermined action may be performed by an interactive region monitoring system, by a device connected to an interactive region monitoring system, by a depth sensor, or by any other suitable device. As an example, an interactive region monitoring system including depth sensor 210 may monitor interactive region 220 for the predetermined event of a user entering interactive region 220. The interactive region monitoring system may also connect to TV 240. When user 230 enters interactive region 220, the interactive region monitoring system may initiate the predetermined action of TV 240 turning on by sending an instruction to TV 240. In some embodiments, a predetermined action may include delivering a message or reminder to a user. For example, user 230 may have a history of watching the show 'Game of Thrones.' If user 230 enters interactive region 220, an interactive region monitoring system may initiate the playing of an audio reminder that informs user 230 that the season premiere of 'Game of Thrones' will start in 10 minutes.

In particular embodiments, a predetermined event may include multiple event conditions. In some embodiments, one event condition may be that other event conditions occur a particular order, within a particular time of one another, or any other relational condition. In particular embodiments, an interactive region may be monitored for multiple predetermined events, each of which triggers a predetermined action. As an example, an interactive region monitoring system may be monitoring interactive region 220 via depth sensor 210 for the predetermined event including the event condition of a user entering interactive region 220. When the event condition is satisfied by the detection of a user entering interactive region 220, the interactive region monitoring system may initiate the predetermined action of turning on TV 240. Additionally, the interactive region monitoring system may be monitoring interactive region 220 for an additional predetermined event including the event condition that particular user 230 enters interactive region 220. If user 230 enters interactive region 220, then the interactive region monitoring system may initiate the predetermined action of tuning TV 240 to a particular channel particular to user 230. As another example, an interactive region monitoring system may be monitoring interactive region 220 for the predetermined event including the event conditions of a user leaving and TV 240 being on. If the interactive region monitoring system detects that TV 240 is on and that a user left interactive region 220, the interactive region monitoring system may initiate the predetermined action of pausing video content on TV 240.

In particular embodiments, an interactive region monitoring system may enhance a physical object or surface in an environment. For example, an interactive region monitoring system may enhance a retail store display by allowing a user to touch or come near a particular item and displaying the price for the item in response. In that example, the interactive region would include all or some of the item or a space near the item, the predetermined event would be contacting or coming near the item, and the predetermined action would be displaying the price of the item. As another example, an interactive region monitoring system may be used in a museum to link objects to content on an audio tour. As another example, an interactive region monitoring system may be used in a classroom to link different parts of the inside of a computer to different video tutorials or to the display of more detailed information about a particular computer component. As another example, an interactive region monitoring system may be used at a corporate event when unveiling a new product to trigger appropriate content in a presentation when interaction with a prototype of the product, such as touching the prototype, occurs. As described more fully herein, this disclosure contemplates that an interactive region may include any suitable space or combination of spaces; a predetermined event may include one or more suitable event conditions; and a predetermined action corresponding to a predetermined event may include any suitable one or more actions.

Figure 3A:
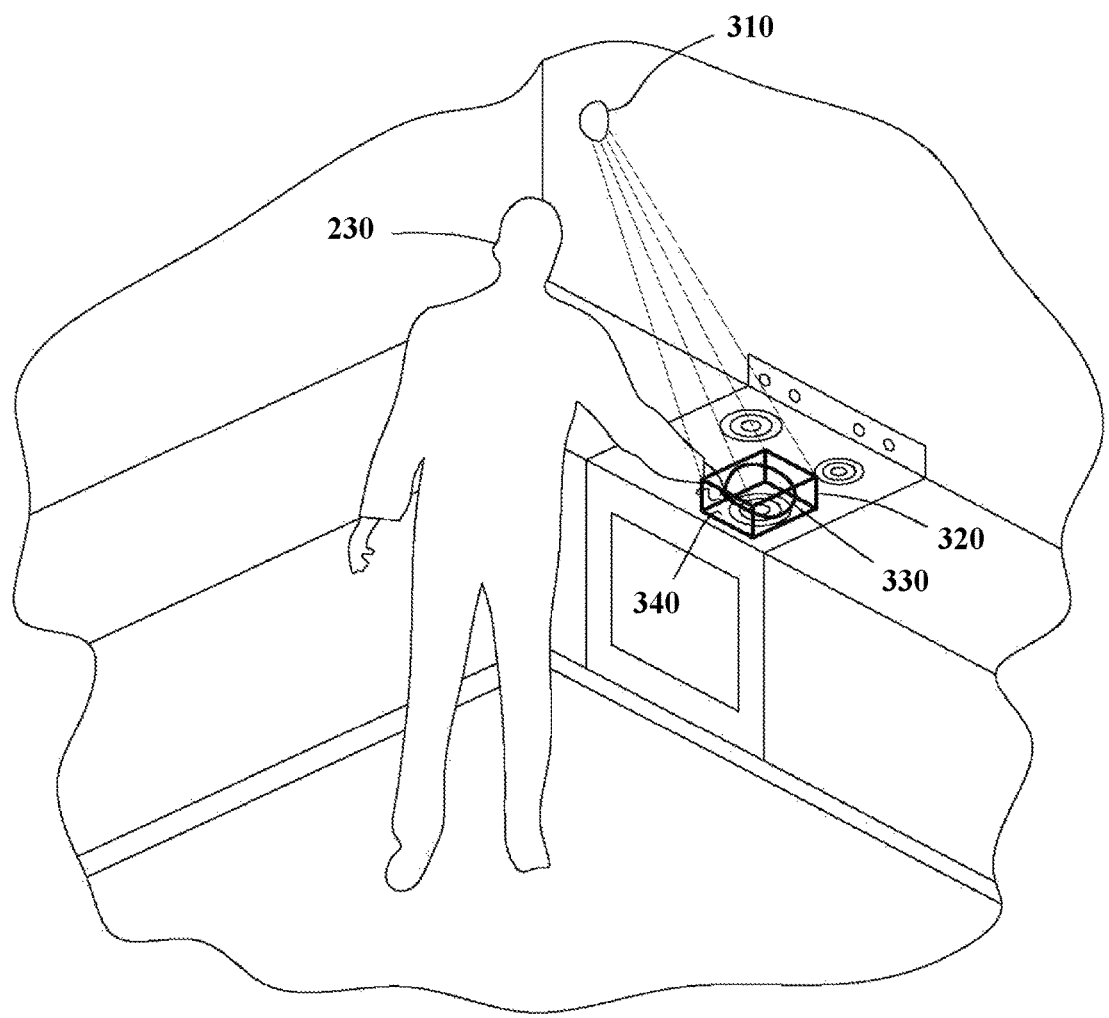
FIGS. 3A-D illustrate example embodiments of a user configuring an interactive region.

FIG. 3A-D illustrates example embodiments of user 230 configuring an interactive region. In some embodiments, configuring an interactive region may include determining an interactive region (e.g., determining the shape, area, location, size, orientation, position, or other properties of an interactive region), moving an existing interactive region, modifying an existing interactive region, or deleting an existing interactive region. In some embodiments, an interactive region monitoring system may store data that represents properties of an interactive region. For example, an interactive region monitoring system may store a data structure corresponding to an interactive region (e.g., a point cloud, a wire-frame model, a parametric-based model, a boundary representation, a binary space partitioning tree, a k-dimensional tree, an octree, a constructive solid geometry tree, a grid, a polygon mesh model, a surface model, a solid computer-aided design (CAD) model, or any other suitable data structure). FIG. 3A illustrates an example embodiment where user 230 determines interactive region 320 via a gesture. For example, the interactive region monitoring system may receive from user 230 user input data that indicates a request to define a new interactive region or to redefine an existing interactive region. In response to receiving the user input data, the interactive region monitoring system may receive location data representative of the location of the interactive region. The interactive region monitoring system may facilitate the user providing location data in a number of ways described below.

In particular embodiments, the interactive region monitoring system may detect and track, using depth sensor 310, a gesture by user 230 to indicate an interactive region. The shape of the interactive region may have a template shape, such as a cuboid (e.g., interactive region 320), a cylinder (e.g., interactive region 350 in FIG. 3B), a polyhedron, a polytope, a sphere, an ellipsoid, a volume bounded by a mesh, a surface area, or any other shape. As an example, user 230 may gesture by moving a hand along path 330. The interactive region monitoring system may detect the gesture via depth sensor 310 and may determine the interactive region 320 based on path 330.

In some embodiments, an interactive region monitoring system may track a gesture via a user device. For example, a user may gesture with a hand that is holding a device, and the device may use an inertial sensor, a GPS sensor, or another suitable sensor to generate and send data to the interactive region monitoring system or other suitable component to determine an interactive region.

In particular embodiments, the shape of an interactive region may be a predetermined type of shape with a minimized volume such that the user's gesture is entirely bounded within the shape. As an example, and not by way of limitation, interactive region 320 may be the cube with the smallest possible volume such that path 330 is within interactive region 320. In particular embodiments, an interactive region may take one of a number of predetermined shapes. In particular embodiments, an interactive region may take the shape created by the user's gesture. This disclosure contemplates any suitable method for defining an interactive region, including by using one or more voice commands, one or more gestures, one or more instruments (such as, e.g. a stylus), etc.

In particular embodiments, a user may indicate that they desire to define an interactive region. For example, user 230 may indicate the desire to define in interactive environment by causing a connected device to send information indicating the desire to an interactive region monitoring system. As an example, and not by way of limitation, user 230 may have a software application installed on a connected device which sends data via a network to an interactive region monitoring system. After receiving an indication of a user's desire to define an interactive region, an interactive region monitoring system may monitor the user's gestures and determine an interactive region based on those gestures. Additionally or alternatively, an interactive region monitoring system may detect a voice command signaling a user's desire to define an interactive region. This application contemplates any suitable method for a user to signal a desire to define an interactive region.

In particular embodiments, an interactive region may intersect physical objects (e.g., a stove, walls, floors, furniture, etc.). As an example, interactive region 320 may extend downward into stove 340. In particular embodiments, portions of an interactive region that intersect a physical object may not be monitored for a predetermined event or event condition.

As an example, if interactive region 320 extends downward into stove 340, the portion of interactive region 320 that includes stove 340 may not be monitored for a predetermined event or event condition.

In particular embodiments, an interactive region, a predetermined event, an action, or any suitable combination thereof may be configured dynamically based on one or more predefined conditions. For example, the shape, area, location, size, orientation, or position of an interactive region may be modified based on a predefined condition. Such conditions may include a time of day, environmental conditions, user preferences, or any other suitable condition. As an example, an interactive region around a lamp may become larger as the area near the lamp becomes darker. As another example, a predetermined event may include a user's presence in an interactive region and a temperature in the room containing the interactive region that is above a threshold temperature. The corresponding action may include turning on the fan. The speed of the fan may change dynamically based on the temperature in the space when the user is present. In some embodiments, an interactive region may be configured to come into existence, be deleted, activate, or deactivate based on conditions. For example, a 24-hour grocery store may use an interactive region monitoring system to monitor two doorways. In this example, one of the doorways may be shut and locked during certain times of the day, and the interactive region corresponding to that entry may be configured to be deactivated during the times of day when the door is locked and to reactivate after that time.

Figure 3B:
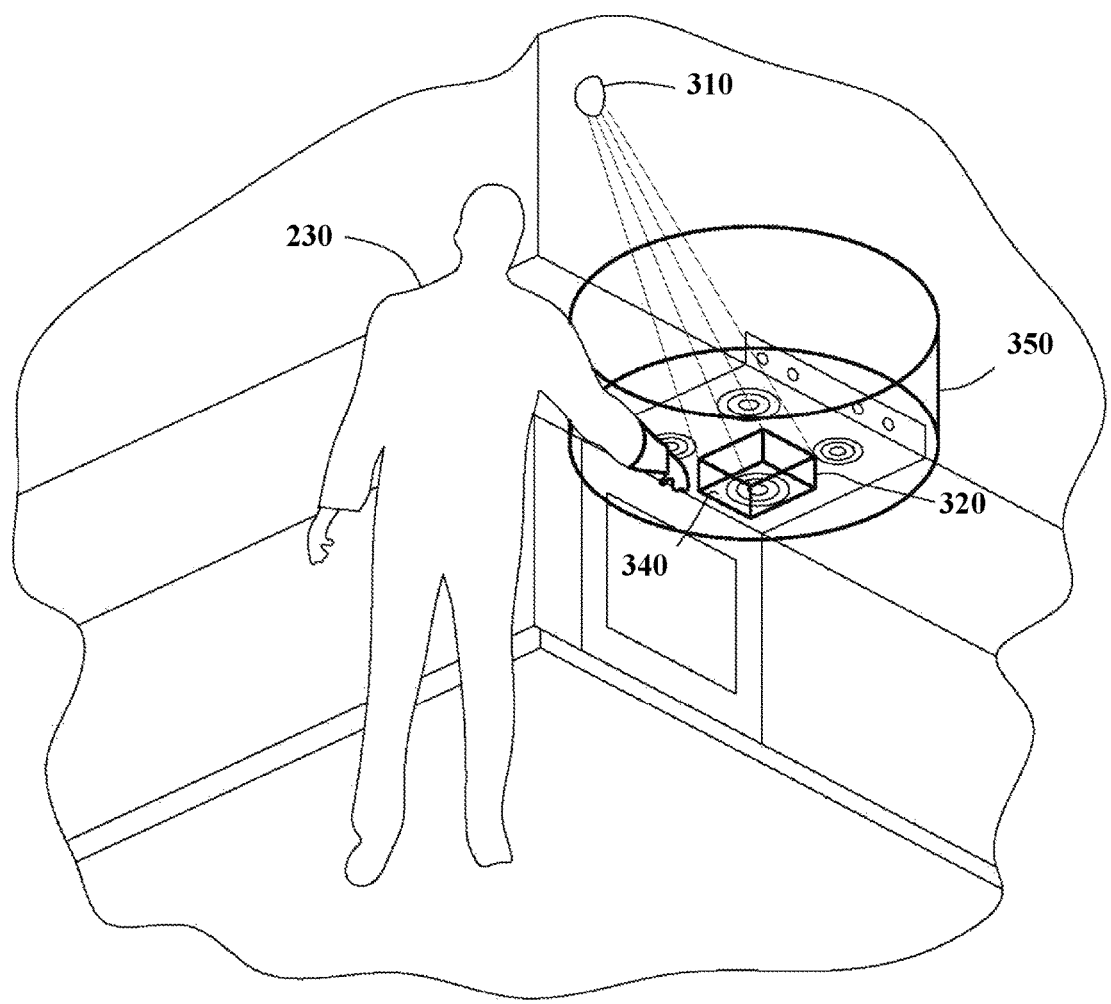

FIG. 3B illustrates an example embodiment of a physical environment in which multiple interactive regions are present. In particular embodiments, multiple interactive regions may be configured. The multiple interactive regions may be distinct from one another, partially overlap, or completely overlap.

In particular embodiments, the image data from overlapping interactive regions are processed or monitored in a manner that may reduce duplication. As an example, interactive region 320 may be within interactive region 350. An interactive region monitoring system may monitor the portions of the physical environment that are within both interactive region 320 and interactive region 350 using the same data. For example, depth sensor 310 may capture an image of the region of overlap between interactive region 320 and interactive region 350, and that image may be used to monitor both region 320 and region 350. In some embodiments, an interactive region monitoring system may be able to monitor a particular region of a physical environment a certain number of times per second. If a particular region of the physical environment is contained within multiple interactive regions, the interactive region monitoring system may monitor the portions of each interactive region that overlaps with another interactive region the same number of times per second as it would if the particular region were only within one of the interactive regions.

In particular embodiments, a predetermined event may include multiple event conditions detected in one or more regions. As an example, an interactive region monitoring system may be monitoring both interactive region 320 and interactive region 350 via depth sensor 310. In this example, a predetermined event may include event conditions that a pot has been placed on the element in interactive region 320 and that a user has left interactive region 350. If the interactive region monitoring system detects the predetermined event, then the interactive region monitoring system may initiate the predetermined action of turning on the element of stove 340 in interactive region 320.

Figure 3C:
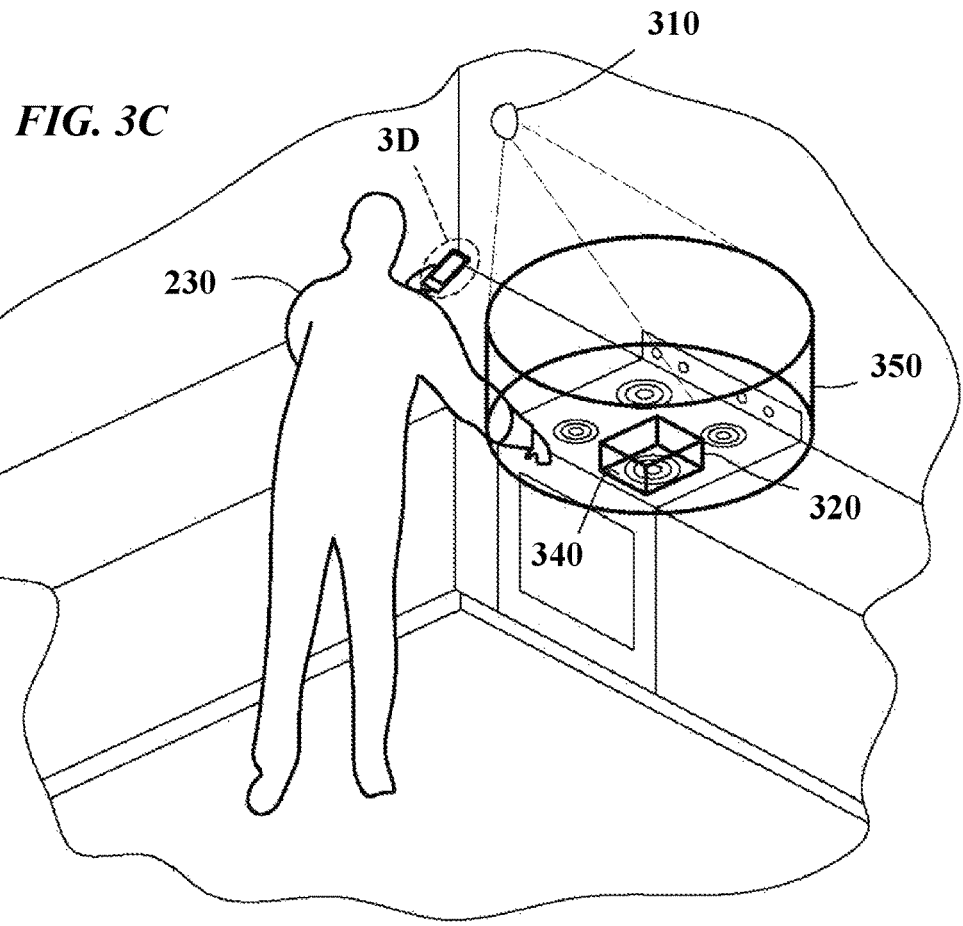
Figure 3D:
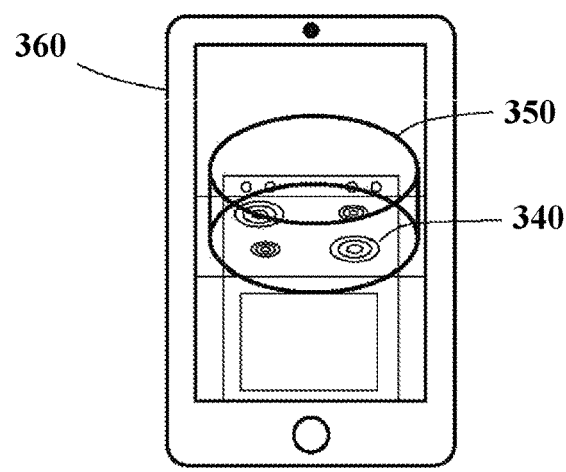

FIG. 3C and 3D illustrate an example embodiment where user 230 determines interactive region 320 using client device 360. In particular embodiments, a user may use a client device to aid in determining an interactive region. As an example, user 230 may wish to determine interactive region 350 via gesture. In general, an interactive region is not visible to a user using only the human eye. In particular embodiments, client device 360 may display part of the physical environment via a camera. Client device 360 may also receive data that determines an interactive region (e.g., the location, position, size, shape, etc.). Client device 360 may display to user 230 an image that includes a visual representation of the interactive region in the physical environment. In particular embodiments, a user may be viewing a client device as they are gesturing and the client device may display an interactive region determined by the gesture as the user is gesturing. In particular embodiments, a client device may display only some interactive regions but not others. For example, FIG. 3D shows only interactive region 350, but not interactive region 320.

In particular embodiments, a user may determine an interactive region via a display of a client device. For example, client device 360 may have software that allows user 230 to determine interactive region 350. The client device may display an image representative of the physical environment (e.g., via a camera). The user may interact with the client device to determine an interactive region. For example, user 230 may use client device 360 to determine interactive region 350 by choosing a shape from a list of shapes and using a touch screen to indicate the position or size of interactive region 350. As another example, user 230 may use client device 360 to determine interactive region 350 by drawing the region on a display of client device 360. This disclosure contemplates any suitable method of a user interacting with a client device to determine an interactive region, including voice command, interacting with a user interface (UI), gesture, or any other suitable method.

Figure 4:
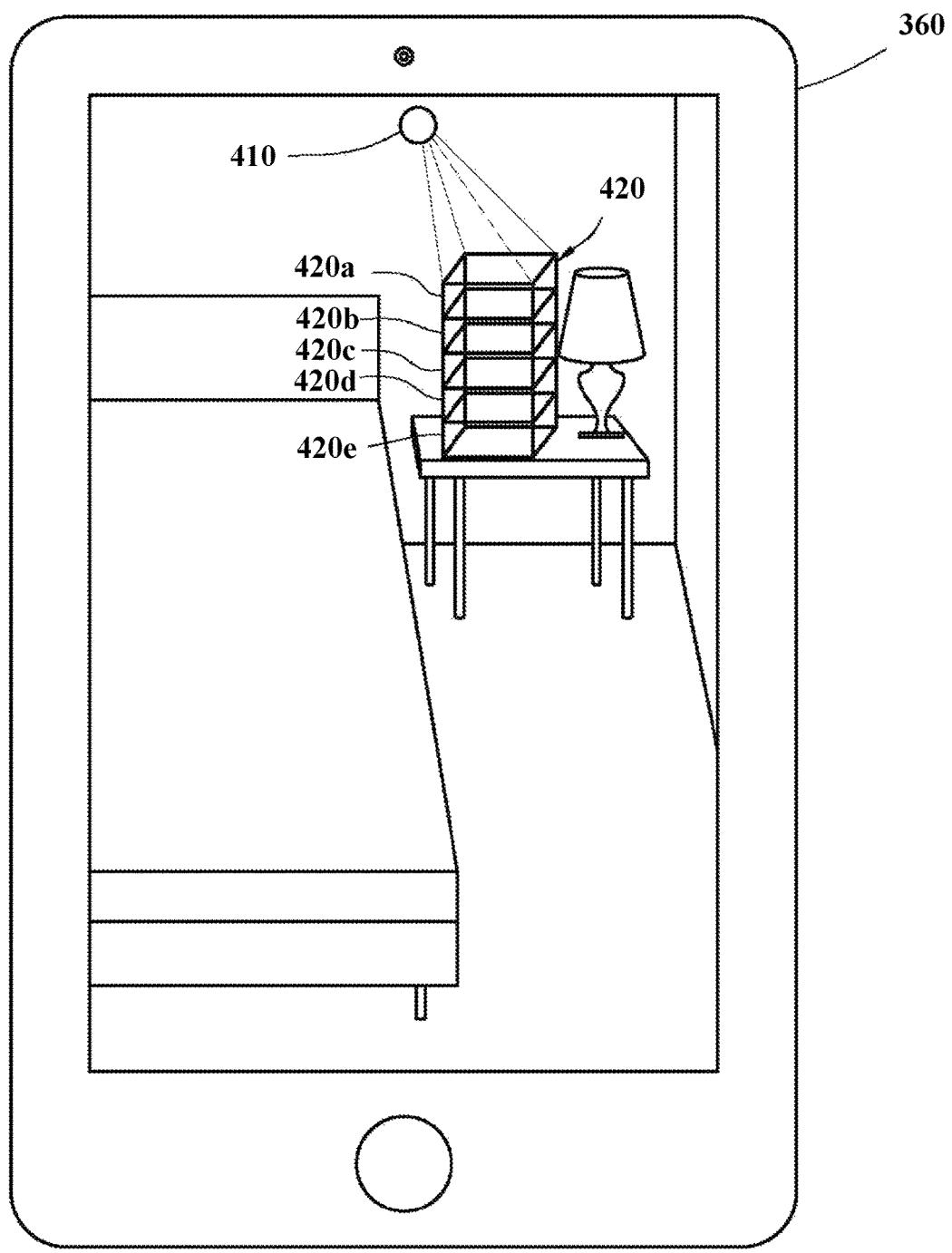
FIG. 4 illustrates multiple example interactive regions in an example physical environment.

FIG. 4 illustrates multiple example interactive regions in an example physical environment. In this example, interactive region 420 contains within it several interactive regions 420a-e. In particular embodiments, interactive region 420 and interactive regions 420a-e may be associated with predetermined events, event conditions, or predetermined actions. As an example, an interactive region monitoring system may monitor via depth sensor 410 interactive region 420 and interactive regions 420a-e for the predetermined event including the event condition of the presence of a user's hand. In this example, once the event condition of a user's hand entering interactive region 420 is detected, the interactive region monitoring system may initiate the predetermined action of toggling the state of lamp 330 (e.g., turning lamp 330 off or on), which may be connected to the interactive region monitoring system. A user's hand entering interactive region 420 may also be a threshold event after which the interactive region monitoring system may detect a predetermined event including event conditions corresponding to the movement of the user's hand between regions 420a-e. For example, if a user's hand enters interactive region 420 and interactive region 420c, then lamp 330 may turn from the off state to the on state. If the user then moves the hand down from interactive region 420c to interactive region 420e, then the interactive region monitoring system may initiate the predetermined action of dimming lamp 330 (e.g., by varying the voltage lamp 330 uses to control the intensity of light output). In this example, each region 420a-e may correspond to a particular level of brightness of lamp 330.

Figure 5:
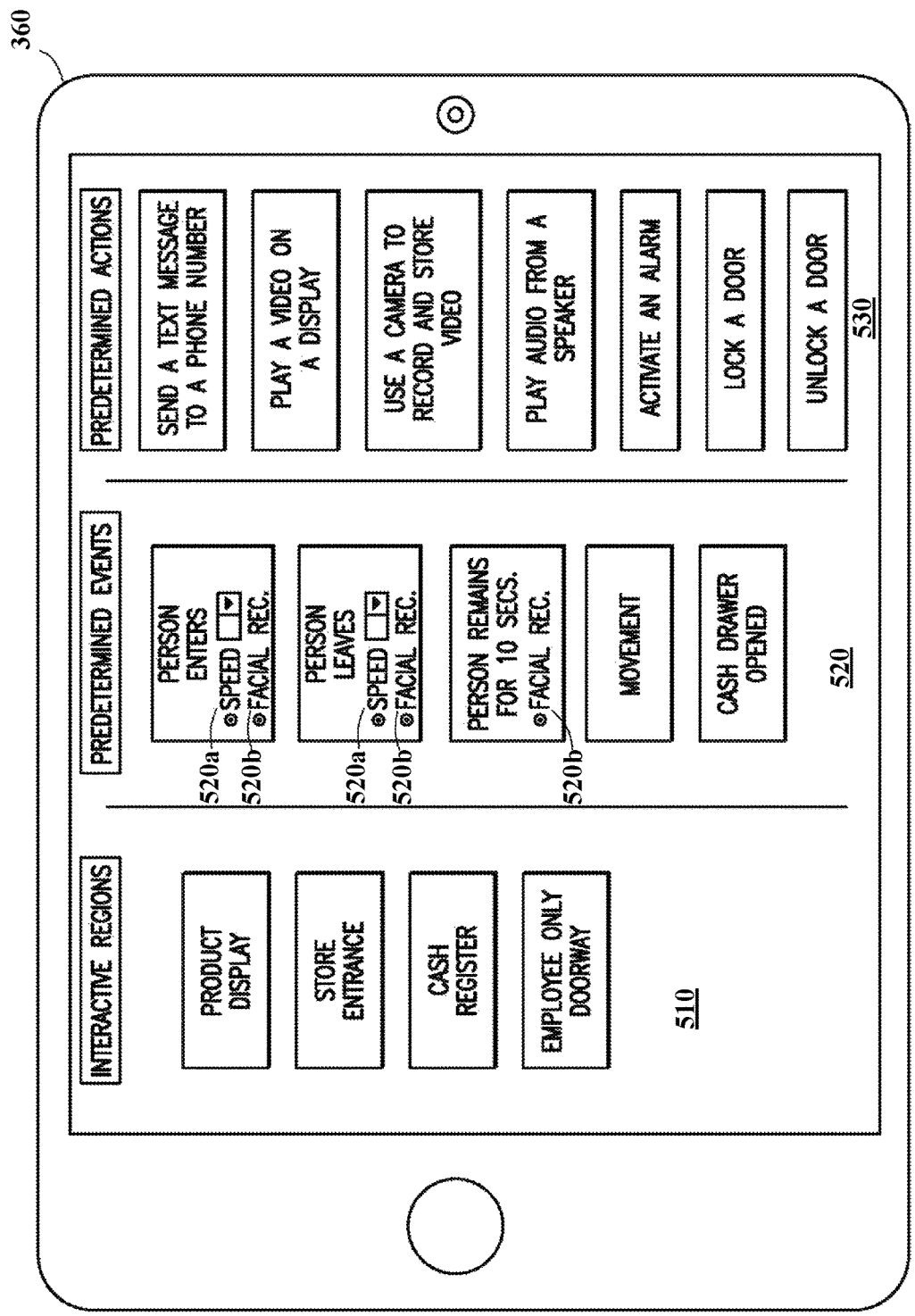
FIG. 5 illustrates an example user interface for configuring interactive regions, predetermined events, event conditions, and predetermined actions.

FIG. 5 illustrates an example user interface (UI) for associating or configuring interactive regions, predetermined events, event conditions, and predetermined actions. A UI may provide a user with the ability to interact with client system 360 in such a way as to configure interactive regions; configure predetermined events or event conditions; configure predetermined actions; and associate interactive regions, predetermined events, event conditions, and predetermined actions with one another. Client system 360 may communicate data that corresponds to a user's interactions to the interactive region monitoring system (e.g., via network 110). Although FIG. 5 illustrates a graphical UI (e.g., a user interface that uses graphical icons or visual indicators displayed on a client system to provide a user with the ability to interact with a client system), this disclosure contemplates using a voice user interface (e.g., a user interface that allows a user to interact with a client system through voice or speech), a gesture interface (e.g., a user interface that provides a user with the ability to interact with a client system through the motion or state of some part of the user's body), or any other suitable type of UI.

In particular embodiments, a UI may include a list of interactive regions. In particular embodiments, the list dynamically updates as a user configures interactive regions. In some embodiments, the interactive regions in the list may be given names. For example, list 510 includes interactive regions with the names "product display," "store entrance," "cash register," and "employee only doorway." In this example, the physical environment may be in a retail store. In particular embodiments, interactive regions may be named in a manner suggestive of the location of the interactive region in the physical environment. For example, the "product display" interactive region in list 510 may be located at a product display in the physical environment, the "store entrance" interactive region in list 510 may be located at the retail store's entrance in the physical environment, and so on. In some embodiments, the UI allows a user to configure an interactive region by assigning or altering a name for an interactive region.

In particular embodiments, a UI may present a list of event conditions. In particular embodiments, a user may configure a predetermined event by selecting one or more event conditions and associate it with one or more regions and one or more predetermined actions. In particular embodiments, an event condition may have one or more user-configurable fields. For example, FIG. 5 illustrates an example list 520 of event conditions. Some event conditions in list 520 have user-configurable fields 520*a-b*. For example, the event condition "person enters" has two user-configurable fields (speed and facial recognition). A user may configure via user-configurable field 520*a* the event condition to be a person enters with a certain speed, greater than a certain speed, less than a certain speed, etc. The event condition "person enters" also has a user-configurable field 520*b*, which a user may use to configure the event condition to be a person with a particular recognized face enters the interactive region. Although FIG. 5 illustrates a particular example list 520, this disclosure contemplates any suitable event conditions or predetermined events with any number of suitable user-configurable fields.

In particular embodiments, a user may define a predetermined event, an event condition, or an action via an ostensive definition (e.g., defining by example via performing or demonstrating an exemplar). For example, an interactive region monitoring system may be configured to recognize user input indicating a user's desire to ostensively define a predetermined event or an event condition in a given interactive region. If a user indicates such a desire, then the interactive region monitoring system may monitor the interactive region. The user may then provide an exemplar of the event condition 'a person enters the interactive region' by entering the interactive region. The interactive region monitoring system may then recognize the exemplar and define based on the exemplar the event condition 'a person enters the interactive region.' In some embodiments, once a predetermined event or an event condition is defined ostensively, the event may be available for selection via a UI (e.g., an ostensively defined predetermined event may appear in list 520 after it is defined).

In particular embodiments, a UI may include a list of predetermined actions. For example, list 530 includes several example predetermined actions. Each action may be further configurable by a user (e.g., by a user-configurable field). For example, the predetermined action "play a video on a display" may allow a user to select a particular display device and a particular video. In general, predetermined actions may be performed by any connected device, and a UI may allow a user to select which predetermined action is performed by which connected device. In some embodiments, a UI may include a list of possible connected devices. In particular embodiments, a UI may include a different list for each connected device, each list including only those predetermined actions that the particular corresponding connected device is capable of performing.

In particular embodiments, a user may define a predetermined event or a predetermined action. For example, a user may define a predetermined event or a predetermined action via interactions with a connected device or by any other suitable means of defining a predetermined event or predetermined action. In some embodiments, when a user defines a predetermined event or a predetermined action, data that corresponds to the user-defined predetermined event or predetermined action may be stored in a data store. In some embodiments, once a user defines a predetermined event or a predetermined action, the user-defined predetermined event or a predetermined action is available in a list, such as list 520 or 530.

In particular embodiments, a UI may allow a user to associate an interactive region, a predetermined event and a predetermined action. In the example above, a user may select the "product display" interactive region from list 510. The user may then associate that interactive region with the predetermined event that includes the event condition "person enters" from list 520. The user may then associate the interactive region and the predetermined event with the predetermined action "play a video on a display" from list 530. The user may further configure the predetermined action to play a video demonstrating the use of a product in the display on a display device near the interactive region. In this example, if a person enters the "product display" region, then the interactive region monitoring system may cause the video to play on the display device.

In particular embodiments, an interactive region may move as an object in the physical environment moves. For example, list 510 contains the interactive region "cash register." This interactive region may correspond to an object cash register in the physical environment of a retail store. The interactive region monitoring system may be monitoring the interactive region for the predetermined event that includes the event condition "cash drawer opened," and may initiate the predetermined action "use a camera to record and store video" if the predetermined event is detected. In this way, the user may record video of the cash register using a connected camera when the cash drawer of the cash register is opened. An employee may be cleaning the area around the cash register and move the cash register. An interactive region monitoring system may detect that the cash register has moved (e.g., by using an image histogram, Canny edge detection, or other suitable means) and cause the interactive region "cash register" to move along with the cash register.

In particular embodiments, particular interactive regions, predetermined events, or event conditions may be prioritized. In particular embodiments, an interactive region monitoring system may have limited processing capabilities, memory, or other computer resources. An interactive region, predetermined event, or event condition may be prioritized by using relatively more or fewer computer resources for the interactive region, predetermined event, or event condition compared to other interactive regions, predetermined events, or event conditions. For example, prioritization may involve using a higher framerate to monitor an interactive region compared to other interactive regions, processing images from an interactive region at a higher rate or sooner than images from other interactive regions, performing more or less resource-intensive types of monitoring, or any other suitable method of prioritization. For example, an interactive region might be monitored for an event condition that involves a high rate of speed. In some embodiments, a user may indicate that the event condition involves a high rate of speed or an interactive region monitoring system may determine that an event condition involves a high rate of speed based on machine learning (e.g., based on an analysis of historical data) or based on an association with a particular type of predetermined event or event condition. In such an example, the interactive region monitoring system may prioritize interactive regions where an event condition involving a high rate of speed is anticipated by monitoring the interactive regions at a higher framerate than is used for other interactive regions. As another example, the event condition "cash register opens" or a predetermined event including that event condition may be prioritized based on the importance of the interactive region or the predetermined event. In some embodiments, there may be a stored variable indicating the importance of an interactive region or predetermined event, which may be modified by an interactive region monitoring system or by a user.

In particular embodiments, particular interactive regions, predetermined events, or event conditions may be automatically prioritized by an interactive region monitoring system based on a monitoring load. A monitoring load may be the computer resources (such as the memory, processors, and sensors) required to administer an interactive region monitoring system, such as monitoring interactive regions; detecting events; creating, altering, activating, or deactivating particular interactive regions, events, and actions; etc. In some embodiments, as interactive regions, predetermined events, or event conditions are monitored, the monitoring load may become greater than the computer resources available to an interactive region monitoring system. In particular embodiments, an interactive region monitoring system may prioritize any suitable aspect of the interactive region monitoring system (such as regions or portions of regions monitored, events monitored, actions initiated, etc.) based on a monitoring load, such as when the monitoring load reaches a threshold monitoring load. In particular embodiments, prioritizing reduces the monitoring load. Examples of prioritization may include: using a lower framerate to monitor an interactive region, delaying the processing of images from an interactive region, performing less resource-intensive types of resource monitoring, or any other suitable method of prioritization. In some embodiments, prioritization based on a monitoring load may by dynamic. For example, an interactive region monitoring system may be automatically prioritized by an interactive region monitoring system based on a monitoring load at a certain time interval or in response to certain triggers (e.g., after an interactive region is configured).

In particular embodiments, a predetermined action may occur at any location. In some embodiments, a predetermined action may occur within an interactive region. For example, the interactive region "employee only doorway" in list 510 may contain a door within the interactive region. A user may associate the interactive region with the predetermined event including the event condition "person enters" in list 520 and use user-configurable field 520*b* to indicate that the face must be recognized as an employee. The user may further associate the interactive region and predetermined event with the predetermined action "unlock a door" in list 530 and configure that action to unlock the door within the interactive region. In this example, when an employee enters the interactive region, the interactive region monitoring system may detect the employee, recognize the employee's face, and then unlock the door. Additionally or alternatively, in some embodiments, a predetermined action may occur outside of an interactive region. As an example, a user may associate the interactive region "store entrance" in list 510 with the predetermined event including the event conditions "movement" in list 520 and that the retail store is closed (e.g., detected by determining the time of day compared to the retail stores hours of operation). The user may associate the interactive region and predetermined event with the predetermined action "send a text message to a phone number" from list 530 to send a text message to the user's phone indicating that someone may be in the retail store after it has closed. In this example, if the interactive region monitoring system detects movement in the "store entrance" interactive region and the store is closed, it may cause a text message to be sent to the user, where the text message may be sent or received outside of any interactive region.

Figure 6:
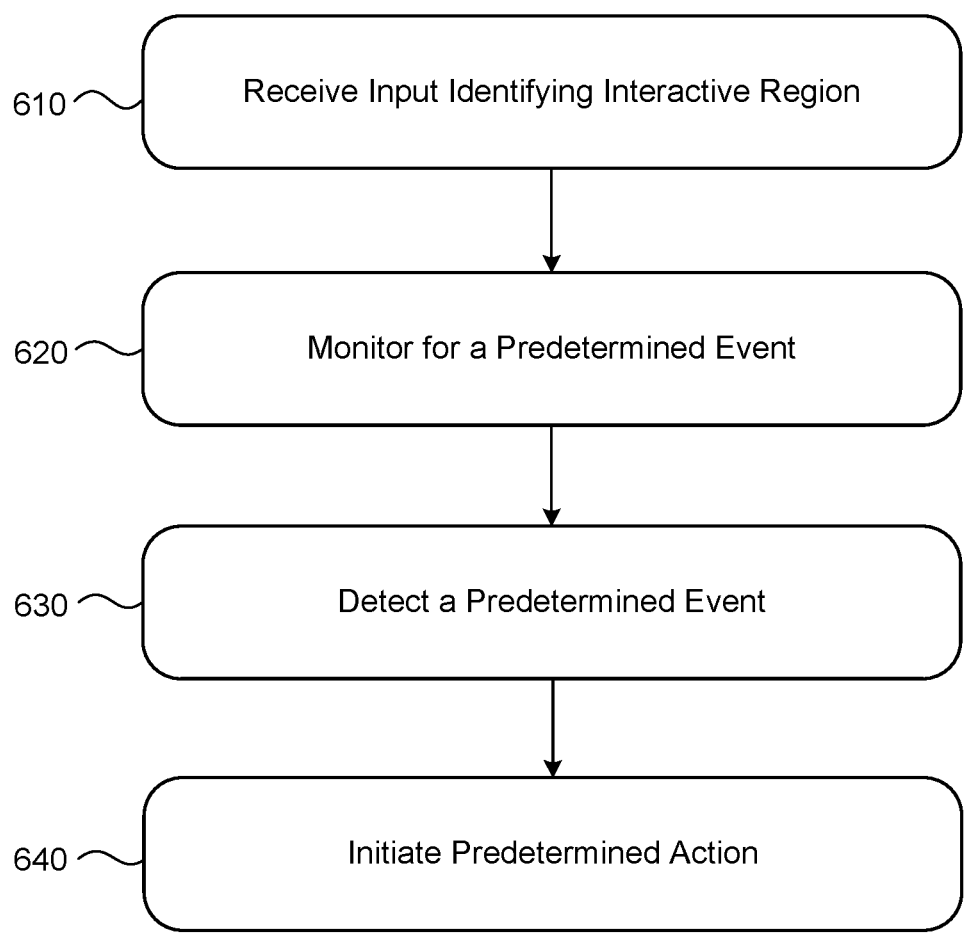
FIG. 6 illustrates an example method implemented by an example interactive monitoring system.

FIG. 6 illustrates an example method 600 implemented by an example interactive monitoring system. In step 610, an interactive region monitoring system may receive input identifying an interactive region. In particular embodiments, the input may be from a user. As discussed above, a user may configure an interactive region by providing input identifying an interactive region via gesture, a connected device, or any other suitable means. In some embodiments, a data store of the interactive region monitoring system may store a data structure corresponding to an interactive region, as described above in greater detail in connection with FIG. 1.

In step 620, the interactive region monitoring system may monitor one or more interactive regions for a predetermined event, including one or more event conditions. In particular embodiments, the interactive region monitoring system may monitor an interactive region by monitoring the physical environment that the interactive region is a part of. In particular embodiments, the physical environment monitored by the interactive region monitoring system may include regions outside of the interactive regions (e.g., an entire field of view of the sensor, room, or building).

In particular embodiments, the physical environment monitored by the interactive region monitoring system may include only interactive regions, i.e., the system or a particular system component may monitor only interactive regions or portions of interactive regions. In particular embodiments, only portions of regions monitored by the system may be processed by the system, as described more fully herein. For example, the interactive region monitoring system may access the data store 140 to determine the locations of the interactive regions in the physical space. The interactive region monitoring system may selectively process portions of the sensor data that correspond to the determined interactive regions.

In particular embodiments, the interactive region monitoring system may monitor for a predetermined event by receiving data from one or more sensors. In some embodiments, as discussed above, data from one or more sensors may be sent to an event detection service of an interactive region monitoring server, which may then use the data received to detect a predetermined event.

In step 630, the interactive region monitoring system may detect a predetermined event in an interactive region. As discussed above, a predetermined event may include one or more event conditions, (e.g., a change within the interactive region, receiving information, environmental conditions, etc.). In particular embodiments, an event detection service of an interactive region monitoring server may determine whether a predetermined event has been detected based on the data received in step 620.

In particular embodiments, the interactive region monitoring system may detected a predetermined event based at least in part on a depth image for the interactive region (e.g., via a depth sensor). As discussed above, a depth image may be generated from a depth sensor, as an example and not by way of limitation, by: stereo triangulation, sheet of light triangulation, structured light, interferometry, coded aperture, or any other appropriate means of detecting a depth image. Other data may also be acquired in step 620, including data related to the detection of sound, chemical particles, electric current, electric potential, magnetic fields, air flow, light, pressure, force, temperature, heat, motion, images, time, date, biometric data, or any other data. In particular embodiments, the depth image may be used, for example, to determine whether an object has entered, is present in, or has left an interactive region. In particular embodiments, an event detection service of an interactive region monitoring server may retrieve the depth image from one or more sensors.

In step 640, the interactive region monitoring system may initiate a predetermined action if a predetermined event is detected in step 630. As discussed above, a predetermined action may take place within an interactive region, outside an interactive region, or both. A predetermined action may be performed by the interactive region monitoring system, by a connected device, or by any other suitable means. In some embodiments, as discussed above, a predetermined action may be initiated by an action initiation service of an interactive region monitoring server.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method implemented by an example interactive region including the particular steps of the method of FIG. 6, this disclosure contemplates any suitable method implemented by any suitable interactive region including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
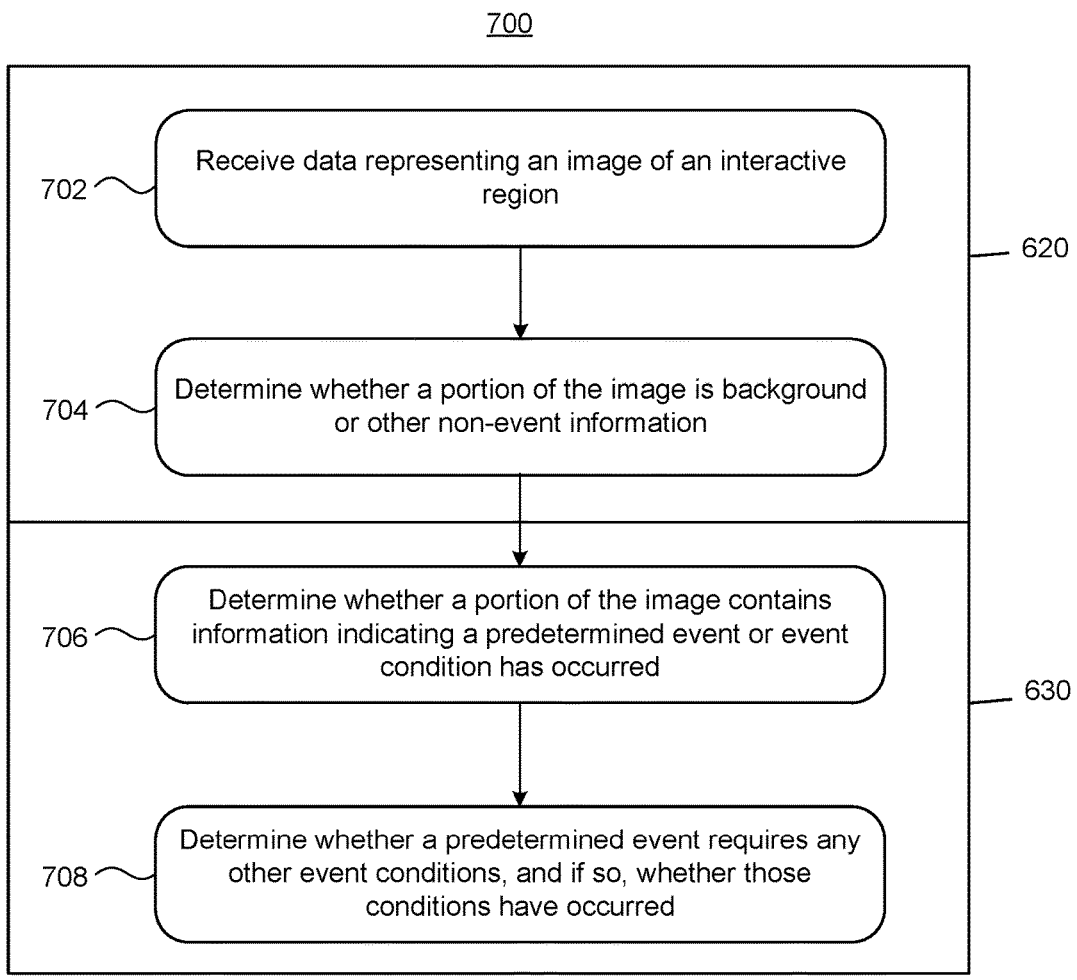
FIG. 7 illustrates an example method for detecting a predetermined event using an image capture by a depth sensor.

FIG. 7 illustrates an example method 700 for monitoring for a predetermined event or an event condition and detecting the predetermined event based on one or more images captured at least in part by a depth sensor. In particular embodiments, steps 620, 630 of FIG. 6 may be performed by using method 700. For instance, steps 702, 704 of FIG. 7 may correspond to step 620 of FIG. 6 and steps 706, 708 of FIG. 7 may correspond to step 630 of FIG. 6. Method 700 may begin with step 702, where a processor of a computing device, such as any suitable computing device described herein, may receive data representing an image of at least a portion of an interactive region.

At step 704, a portion of the image may be characterized as background or other non-event information. For example, the method may refer to previous images of the environment and identify portions that have not changed, or have not changed more than a particular threshold, as background. In particular embodiments, only background or non-event data for the portion of the image corresponding to the interactive region may be identified. In particular embodiments, the background of an image may be subtracted from the image prior to processing the image. In particular embodiments, background subtraction may be accomplished by frame differencing, using a mean filter, running a Gaussian average, using a background mixture model, or any other suitable method. In particular embodiments, background subtraction may isolate objects in the foreground of an image to aid in the detection of movement, object detection, object localization, object recognition, object tracking, semantic segmentation, or other forms image processing. In particular embodiments, background subtraction may allow data that indicates change (e.g., movement, change in color, etc.) to be isolated from other data. In particular embodiments, only background corresponding to the interaction region may be subtracted.

At step 706, a portion of the image not characterized as background or non-event data may be processed to determine whether the portion contains information indicating that an event or event condition has occurred. Image processing may include measuring the level of the background-subtracted information and comparing the level to a threshold. If the level is greater than the threshold, then it may be determined that an event or event condition has occurred. Additionally or alternatively, image processing may also include object recognition, facial recognition, or any other type of image processing. Any suitable techniques may be used to process an image, for example and not by way of limitation: edge matching, detection of a change in lighting or color, greyscale matching, using a histogram, comparing an image to a one or more other images, using an interpretation tree, etc. In particular embodiments, data identifying or an event or event condition may be accessed from a profile or record particular to the interactive region being analyzed, as described more fully above. In particular embodiments, step 706 may include skeleton tracking (e.g., using skeleton data to infer a body position of a person or a gesture made by a person). In particular embodiments, skeleton tracking may be accomplished by using a model representing a human target, where the model may include adjustable skeletal points corresponding to the joints on a human. In some embodiments, the model may be adjusted into different poses corresponding to poses performed by the human target. In some embodiments, skeleton data may be determined based on a comparison of data corresponding to known gestures or poses. In some embodiments, machine learning may be used to determine skeleton data. In particular embodiments, skeleton data may indicate that a person or a part of a person is within, has entered, or has left a particular interactive region.

If no event or event condition is detected in step 706, method 700 may end, and step 620 of FIG. 6 may be performed. If an event is detected, method 700 may end, and step 640 of FIG. 6 may be performed. In particular embodiments, method 700 may include step 708, where the method determines whether a predetermined event requires any additional event condition(s), and if so, whether those event condition(s) have been satisfied. As described more fully herein, the occurrence of other event conditions may be determined by processing the image captured by the depth sensor or determined from output from any other suitable sensor. If other event conditions are required to detect an event and at least one of those event conditions is not satisfied, then the method may end, and step 620 of FIG. 6 may be performed. If an event does not include additional event conditions, or if all the required additional event conditions are satisfied, then the method may end, and step 640 of FIG. 6 may be performed.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for detecting a predetermined event, or an event condition, including the particular steps of the method of FIG. 7, this disclosure contemplates any suitable method for detecting a predetermined event, or an event condition, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
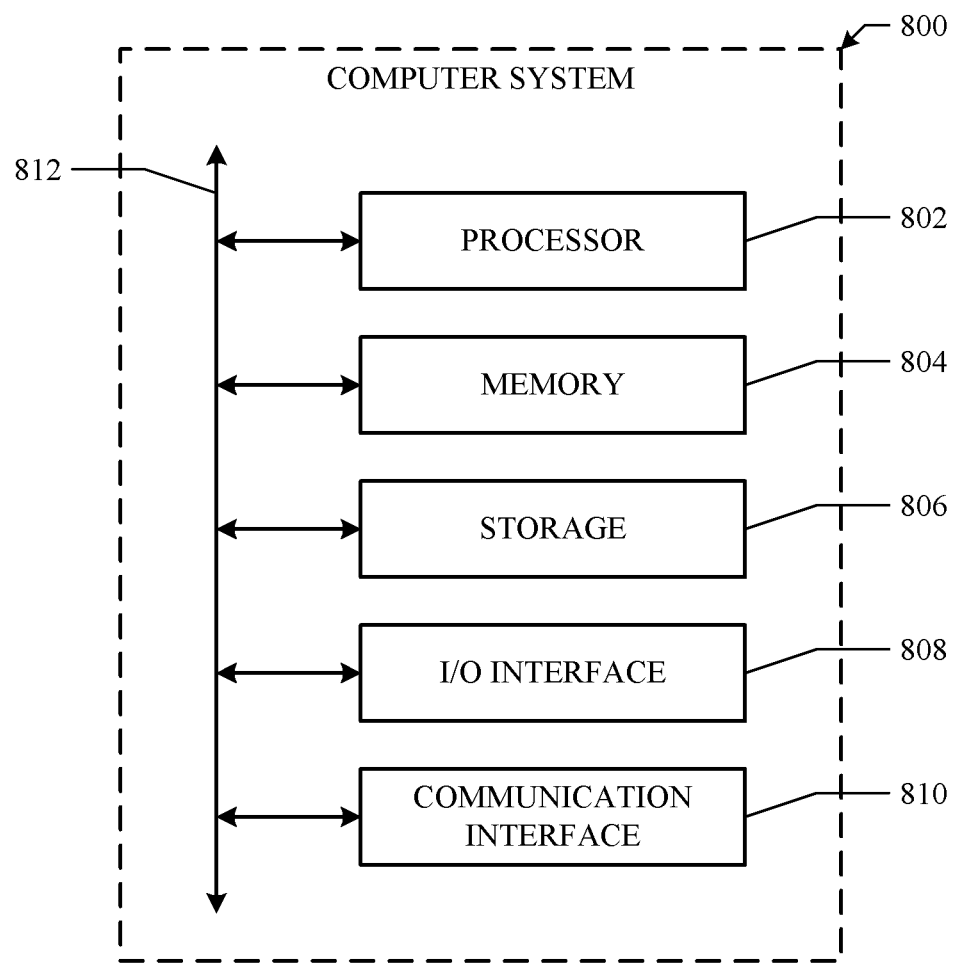
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate. [83] In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An apparatus comprising:
   a depth sensor;
   one or more computer-readable non-transitory storage media embodying instructions; and
   one or more processors configured to execute the instructions to:
      monitor, at least in part based on output of the depth sensor, a physical environment comprising a user-defined interactive region for a predetermined event, wherein the user-defined interactive region is configured at least in part based on user input;
      detect, at least in part based on the output of the depth sensor, the predetermined event in the interactive region; and
      in response to detection of the predetermined event, initiate a predetermined action associated with the predetermined event.

2. The apparatus of claim 1, wherein the predetermined event includes a touch by the user with respect to an object in the interactive region.

3. The apparatus of claim 2, wherein the predetermined action associated with the predetermined event includes displaying information associated with the object.

4. The apparatus of claim 3, wherein:
   the object includes a product; and
   the predetermined action associated with the predetermined event includes displaying a price associated with the product.

5. The apparatus of claim 3, wherein the predetermined action associated with the predetermined event includes displaying a video associated with the object.

6. The apparatus of claim 3, wherein the information associated with the object is displayed by a display device near the interactive region.

7. The apparatus of claim 1, wherein the user input is provided by at least one of: a voice command, a gesture, or an instrument.

8. A method comprising:
   monitoring, at least in part based on output from a depth sensor, a physical environment comprising a user-defined interactive region for a predetermined event, wherein the user-defined interactive region is configured at least in part based on user input;
   detecting, at least in part based on the output of the depth sensor, the predetermined event in the interactive region; and
   in response to detecting the predetermined event, initiating a predetermined action associated with the predetermined event.

9. The method of claim 8, wherein the predetermined event includes a touch by the user with respect to an object in the interactive region.

10. The method of claim 9, wherein the predetermined action associated with the predetermined event includes displaying information associated with the object.

11. The method of claim 10, wherein:
    the object includes a product; and
    the predetermined action associated with the predetermined event includes displaying a price associated with the product.

12. The method of claim 10, wherein the predetermined action associated with the predetermined event includes displaying a video associated with the object.

13. The method of claim 10, wherein the information associated with the object is displayed by a display device near the interactive region.

14. The method of claim 8, wherein the user input is provided by at least one of: a voice command, a gesture, or an instrument.

15. One or more computer-readable non-transitory storage media embodying software that is operable when executed to:
    monitor, at least in part based on output of the depth sensor, a physical environment comprising a user-defined interactive region for a predetermined event, wherein the user-defined interactive region is configured at least in part based on user input;
    detect, at least in part based on the output of the depth sensor, the predetermined event in the interactive region; and
    in response to detection of the predetermined event, initiate a predetermined action associated with the predetermined event.

16. The media of claim 15, wherein the predetermined event includes a touch by the user with respect to an object in the interactive region.

17. The media of claim 16, wherein the predetermined action associated with the predetermined event includes displaying information associated with the object.

18. The media of claim 17, wherein:
    the object includes a product; and the predetermined action associated with the predetermined event includes displaying a price associated with the product.

19. The media of claim 17, wherein the predetermined action associated with the predetermined event includes displaying a video associated with the object.

20. The media of claim 17, wherein the information associated with the object is displayed by a display device near the interactive region.

* * * * *